United States Patent [19]

Mühling et al.

[11] 3,973,443

[45] Aug. 10, 1976

[54] TIMING RELAY HAVING AN ELECTRIC MOTOR DEVICE

[75] Inventors: Alois Mühling, Pleinfeld; Helmut Schmidt, Nurnberg, both of Germany

[73] Assignee: Siemens Aktiengesellschaft, Munich, Germany

[22] Filed: Apr. 24, 1975

[21] Appl. No.: 571,233

[30] Foreign Application Priority Data

Apr. 29, 1974 Germany ............................ 2420651

[52] U.S. Cl. .................................. 74/3.5; 74/568 R; 74/568 T; 335/75

[51] Int. Cl.[2] .............................................. F16H 5/74

[58] Field of Search ............... 335/74, 75; 74/568 T, 74/568 R, 3.52, 3.5, 2

[56] References Cited

UNITED STATES PATENTS 3,747,420 7/1973 Weber et al. ......................... 74/3.52

FOREIGN PATENTS OR APPLICATIONS 1,153,107 8/1963 Germany

*Primary Examiner*—Benjamin W. Wyche
*Assistant Examiner*—F. D. Shoemaker
*Attorney, Agent, or Firm*—Kenyon & Kenyon Reilly Carr & Chapin

[57] ABSTRACT

In a timing relay including an indexing gear wheel driven by a clutched gear wheel which is driven by an electric motor and in which an actuating element is controlled by means of a cam coupled to the indexing gear wheel with the actuating element being used to operate contact elements on displacement thereof, the actuating element is disposed parallel to the indexing gear wheel and is also arranged to control engagement and disengagement of the clutched gear wheel with the indexing gear wheel.

11 Claims, 7 Drawing Figures

TIMING RELAY HAVING AN ELECTRIC MOTOR DEVICE

BACKGROUND OF THE INVENTION

This invention relates to timing relays having motor drives in general and more particularly to an improved relay of this nature which is more compact and more reliable.

Timing relays using electric motor drives in which a clutched gear wheel is driven through gears by the relay motor and engages an indexing gear wheel when its drive shaft is properly shifted upon the switching on of the timing relay are known. In such arrangements, the clutched gear wheel and indexing gear wheel are disengaged after a preset delay time has passed. Furthermore, there is provided in such relays delayed actuation of at least one switching contact caused by a displaceably arranged actuating element spring coupled to a solonoid armature and having its displacement controlled by the indexing gear wheel.

Such a timing relay is known. In the known arrangement, shifting of the drive shaft is carried out by means of a spring loaded lever which is released by the relay armature when the timing relay is switched on. After the delay time has expired, the lever is swung back by an arm connected with the actuating element and the indexing gear wheel is thereby disengaged from the clutched gear wheel. Furthermore, a locking lever is provided which locks the actuating element in its starting position after the timing relay is switched on. Once the predetermined delay time has expired, the locking lever is shifted by the indexing gear wheel and releases the actuating element. Thereupon, the actuating element is displaced by the force of a spring which became tensioned when the armature of the solonoid was pulled in and switching contacts are actuated.

The arrangement of the lever for engaging the clutched gear wheel of the locking lever in this known timing relay requires a great deal of space. Furthermore, because of the large number of moving parts, its reliability is lowered.

In view of these deficiencies, the need for an improved relay of this nature which takes up less space and is more reliable becomes evident.

SUMMARY OF THE INVENTION

The present invention provides such a timing relay. The necessary advantages with the regard to space saving and reliability are obtained as a direct result of the arrangement of the indexing gear wheel and the actuating elements in parallel planes one above the other. In addition, the actuating element is arranged so that it is first displaced a small amount when the timing relay is switched on to permit engagement of the two gear wheels and, after the preset delay time has expired, is additionally displaced in the same direction, to both cause disengagement of the two gear wheels and closing of the necessary contacts.

The drive shaft of the clutched gear wheel is directly shifted by the actuating element making possible simplified operation. For this purpose, the actuating element contains two oblique projections on one side, the two projections angled in opposite directions with the drive shaft resting against the inner angled surfaces of the projections under the force of a coupling spring. The projections are arranged such that, (a) in a position corresponding to a first amount of displacement, the clutched gear wheel will engage the indexing gear wheel; and (b) in the at rest position prior to the relay being switched on and in a position of additional displacement beyond that of the first amount of displacement which occurs after the predetermined delay time has expired, the clutched gear wheel will be disengaged from the indexing gear wheel.

In accordance with a further feature of the present invention the displacement of the actuating element in the off position of the timing relay is limited by a stop fixed relative to the housing. During the period in which the predetermined delay time is running, the actuating element is limited by a dog coupled to the actuating element and sliding on a cam coupled to the indexing gear wheel. The cam contains a notch which, after the predetermined time delay has run out, accepts the dog on the actuating element to limit displacement to the desired position. Through this cam arrangement the individual steps of displacement are limited in a simple manner. In addition, any adjustment of the two steps is unnecessary.

In accordance with the disclosed embodiment, the projections controlling the drive shaft of the clutched gear wheel are located on an arm coupled to the actuating element which is adjustable in a direction toward the drive shaft. As a result, manufacturing inaccuracies which could have a detrimental effect on the engagement and disengagement of the two gear wheels can easily be adjusted out. Similarly arrangements are provided for adjustment of the engagement of switching contacts. That is to say, the actuating element contains a plurality of switching arms corresponding to the number of switching contacts to be operated. These arms are adjustable in the displacement direction of the actuating element so that they can be appropriately adjusted so that all switching contacts are made at the same time, or if desired in a staggered manner.

In the disclosed embodiment the timing relay also has a contact element which is operated without a delay. In accordance with a further feature of the present invention separate means for actuating this contact element are not necessary since it is operated directly by the solonoid armature.

Another feature of the relay of the present invention is a rotatable pawl which locks the armature of the relay into the on position during the predetermined time period. In accordance with the present invention separate parts for releasing the pawl are not necessary. Rather, the pawl is moved out of the locked position at the end of the time delay by means of an unlocking dog provided at the actuating element. The locking pawl includes a shaft which can be supported in appropriate bearings to permit rotation of the locking pawl. In the preferred embodiment this shaft is supported in a half-shell of a bearing depression in a plate fixed relative to the housing and the bearing shell is covered by the actuating element. Because of this separate fastening parts for supporting the pawl are also unnecessary.

A further feature of the relay of the present invention is that of providing indicating means for indicating different operational states of the timing relay. Such indicating devices generally comprise at least one viewing aperture at the front of the housing and an indicating element appearing behind it. This is accomplished in a simply manner in accordance with the present invention by mounting indicating elements directly on the actuating element. Because of the two step displacement of the actuating element it is possible to mount an indicating arm on the actuating element which extends toward the viewing aperture and is provided with two different marking symbols one behind the other in the direction of displacement. Through proper arrangement one indicating means will be visible at the viewing aperture after the first portion of the displacement and the other after the second part of the displacement.

DETAILED DESCRIPTION OF THE PREFERRED EMBODIMENT

Figure 1:
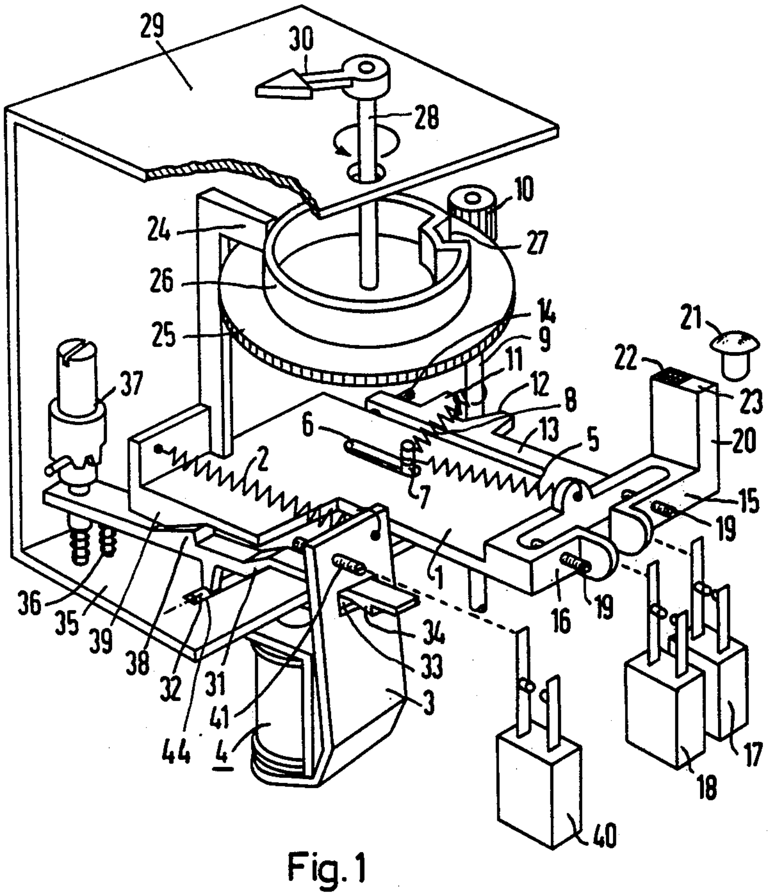
FIG. 1 is a perspective view of a timing relay according to the present invention.

FIG. 1 is a perspective view of the timing relay of the present invention with FIGS. 2*a*–4*b* showing the same relay in various states of operation as will be explained in more detail below. Identical parts are given the same reference numerals in all figures. The key element of the relay of the present invention is the actuating element 1. As illustrated, it is coupled by means of a spring 2 to the armature 3 of a solonoid 4. It is also coupled by means of a restoring spring 5 to a stop 7 which is fixed relative to the housing of the relay and protrudes through a slot 6 in the actuating element 1. Linked to the stop 7, which is fixed relative to the housing is an additional coupling spring 8 which has its other end connected to the drive shaft 9 of a clutched gear wheel 10. The clutched gear wheel 10 is driven by a motor and gear arrangement in conventional fashion. The motor and gear arrangement are not shown on the figures for sake of simplicity. The coupling spring 8 pulls the drive shaft 9 against two internally angled projections 11 and 12 formed in an arm 13 attached to the actuating element 1. A screw 14 is provided to permit lateral adjustment of the arm 13 to permit adjustment of engagement of the clutched gear wheel 10 with an indexing gear wheel 25 to be described in more detail below.

In addition, the actuating element 1 contains switching arms 15 and 16 on its front portion. These switching arms also are adjustable by means of screws 19. As will be explained in more detail below, the switching arms 15 and 16 operate switching contacts 17 and 18 at the end of the delay time of the timing relay. Also coupled in the same area is an indicating arm 20 containing marking symbols 22 and 23 which can be viewed through a lens 21 to indicate the state of the relay.

On the side of the acutating element opposite the switching arms 15 and 16, a vertical extending control dog 24 is provided. Control dog 24 cooperates with a cam 26 rigidly connected to the indexing gear wheel 25. The indexing gear wheel 25 is supported in a first bearing plate 29 for rotation therein. Bearing plate 29 is fixed relative to the housing of the relay. At the end of the shaft of the indexing gear wheel a pointer 30 is provided to indicate the amount of time which has run out. The cam 26 comprises a cylindrical surface over the major portion of its circumference with a notch 27 formed therein for purposes to be more fully described below.

For locking the armature 3 into an on position once the solonoid 4 has been switched on, a locking pawl 31 is provided. The pawl 31 is pivoted about an axis 32 and protrudes with its one end through a slot 33 in the armature 3. On its end, the pawl 31 contains a locking dog 34. The other end of the pawl 31 is engaged by a compression spring 36 disposed between the pawl and the second bearing plate 35 fixed relative to the housing. By means of this compression spring 36 the pawl 31 is rotated once the armature 3 has pulled up to permit the locking the dog 34 to snap in behind the slot 33. Through an arresting knob 37, the pawl 31 can be placed in its off position. For purposes of automatically unlocking the pawl at the end of the time delay, an additional projection 38 is provided on the pawl. This cooperates with an unlocking dog 39 on the actuating element 1. Also illustrated, is a contact element 40 which will be actuated without a delay by means of an adjusting screw attached to the armature 3 of the solonoid 4. Because the armature 3 is locked by the pawl 31 it is insured that the timing relay will always stop at the position that it has reached should the excitation voltage fail and it will continue from that position when the excitation voltage is returned. This arrangement also makes possible the performance of time additions with the relay. This is a cross sectional view taken along V—V of FIG. 1. With reference to both FIGS. 1 and 5 it can be seen that the pawl 31 is rigidly attached to a shaft 44. The shaft 44 rests in a bearing depression 43 formed in the bearing plate 35.

Figure 2B:
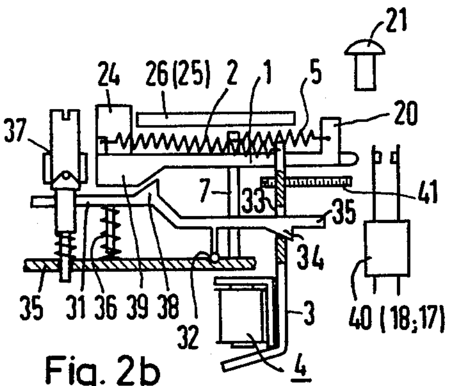
FIG. 2*b*, is a side view of the timing relay in the position of FIG. 2*a*.
Figure 2A:
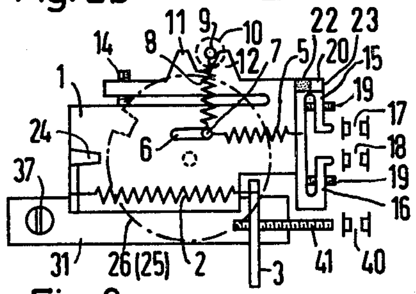
FIG. 2*a*, is a plan view of the timing relay of FIG. 1 in a rest position.

The operation of the timing of the present invention will now be explained with references to FIGS. 2*a*–4*b*. FIGS. 2*a* and 2*b* show the timing relay of the present invention before the coil of solonoid 4 is energized. In this state, the actuating element 1 is all the way to the rear retained against the pin 7 by the force of the spring 5. In this position, the shaft 9 is against the angular edge 12 and the clutched gear wheel 10 is not engaged with the indexing gear wheel 25. The indicating arm 20 is behind the lens 21 and no indication is given, showing that the relay is not operating.

Figure 3B:
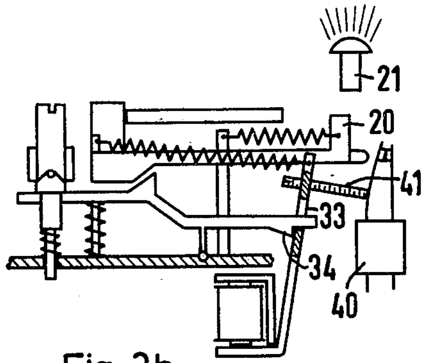
FIG. 3*b*, is a side view of the timing relay in the same state as FIG. 3*a*.
Figure 3A:
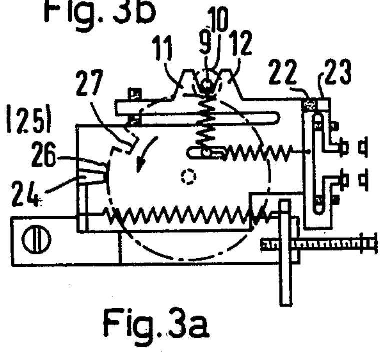
FIG. 3*a*, is a plan view of a timing relay according to FIG. 1 during the period when the delay time is running.

When voltage is applied to the coil of solonoid 4, the armature 3 is pulled up. This state of the relay is illustrated by FIGS. 3*a* and 3*b*. As the armature is pulled in, the notch 34 of the pawl 31 engages in the hole 33 to hold the armature in place even should the coil be deenergized. The contacts 40 are closed by the adjustable screw 41. The indicating arm 20 is now in a position where its portion 23 is below the lens 21 and a suitable indication is given. Movement of the armature causes a corresponding movement of the actuating element 1 which moves forward until the dog 24 comes to rest against the cam 26. In this position, the drive shaft 9 moves into the space of the gap formed by the two projections 11 and 12 permitting the clutched gear wheel 10 to engage the indexing gear wheel 26. The indexing gear wheel is then driven in a counterclockwise direction as indicated by the arrow on the figure. The timing relay is now going through its predetermined delay time period. Coupling spring 8 holds the two gear wheels intermeshed. Preferably the two gear wheels 10 and 25 will be gears with external teeth although other forms of engagement are possible. The relay will remain in this state until the notch 27 in the cam 26 is reached. At that point, the timing relay will go into the state illustrated by FIGS. 4a and 4b. The dog 24 will ride into the notch 27 permitting additional forward movement of the actuating element 1. Its forward arms 15 and 16 will close the contacts 17 and 18 respectively. The forward movement will cause the drive shaft 9 to ride up on the angled edge of the projection 11 to bring the clutched gear wheel 10 out of engagement with the indexing gear wheel 25.

Figure 4B:
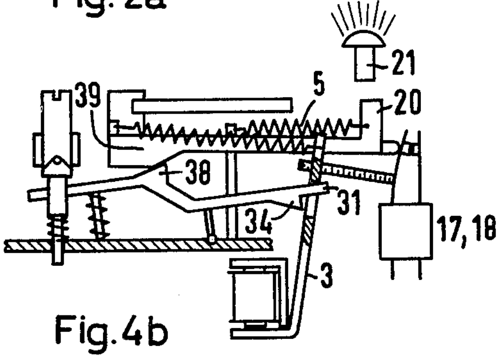
FIG. 4*b*, is a side view of the timing relay in the same condition as FIG. 4*a*.
Figure 4A:
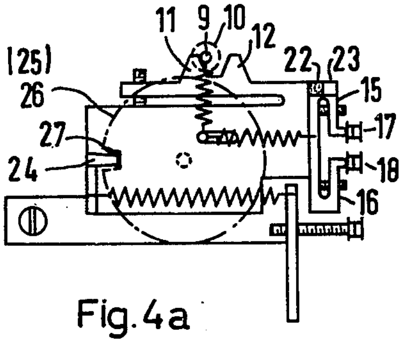
FIG. 4*a*, is a plan view of the timing relay after the predetermined delay time has expired.

As illustrated by FIG. 4*b*, the pawl 31 is rotated by the unlocking dog 39 on the actuating element 1 engaging the projection 38, as the actuating element 1 moves forward, to release the locking dog 34 and thus permit the armature 3 to be released. In other words, the unlocking dog 39 pushes down against the projection 38 pushing that side of the pawl 31 downward causing it to rotate about the axis 32 thereby raising other portion of the pawl 31 containing the locking dog 34 to effectively move it out of the way. Compared this with FIG. 3b in which the locking dog 34 is engaging the armature 3. The armature 3 will stay in position shown as long as voltage is applied. An indication of the state of the timing relay will be provided by the alignment of the indicating symbol 22 with the lens 21. Once the voltage is removed from the coil, the actuation element will be returned to its starting position of FIGS. 2*a* and 2*b* through the force of spring 5, the pawl 31 with its dog 34 having been moved out of the way as described above. As noted above, the starting position is defined by the position where the end of the slot 6 rests against the stop 7 and thus the starting position is predetermined and fixed.

The arrangement of the indexing gear wheel 25 and the actuating element 1 in parallel planes permits actuating switch contacts 17 and 18 with the required delay along with engaging and disengaging the clutched gear wheel 10 to and from the indexing gear wheel 25 directly with the actuating element. Thus, only a single part is required to perform both functions. Because of this arrangement the number of parts in the timing relay of the present invention is reduced considerably with respect to prior art relays. This leads to a greater reliability along with simplified installation and adjustment procedures.

Thus an improved timing relay which is simpler and more reliable has been shown. Although a specific embodiment has been illustrated and described, it will be obvious to those skilled in the art that various modifications may be made without departing from the spirit of the invention which is intended to be limited solely by the appended claims.

We claim:

1. In a timing relay having an electric motor drive in which a clutched gear wheel is driven through gears by the relay motor and engages an indexing gear wheel through a shifting of its drive shaft on switching on of the timing relay and is disengaged after a predetermined delay time has expired, and which timing relay includes means for the delayed actuation of at least one switching contact, said means comprising a displaceably arranged actuating element coupled by a spring to the armature of a solonoid with the displacement of the actuation element controlled by the indexing gear wheel, the improvement comprising:

a. the actuating element and the indexing gear wheel arranged in parallel planes one over the other;

b. means on said actuating element for causing the engagement and disengagement of said clutched gear wheel with said indexing gear wheel;

c. means causing said actuating element to be displaced a first distance in one direction to cause engagement of said clutched gear wheel upon actuation of the armature; and d. means to cause said actuation element to be displaced a further distance in the same direction upon the expiration of the predetermined delay time.

2. Apparatus according to claim 1 wherein said means for causing comprise first and second projections on the side of said actuating element, said projections having internal angled faces oppositly directed with a gap therebetween and a coupling spring urging said drive shaft into the gap between said projections said projections located so that prior to said first displacement, said drive shaft will rest against one of said faces holding said clutched gear wheel out of engagement, after said first displacement said drive shaft will rest in the gap between said projections permitting engagement, and after said second displacement said drive shaft will rest on the other face moving said clutched gear wheel out of engagement.

3. Apparatus according to claim 1 wherein means are provided to limit the position of said actuating element prior to energization and wherein said means causing said first displacement comprise:

a. a spring coupling said actuating element to the armature of said solonoid;

b. a cam coupled to said indexing gear wheel;

c. a dog coupled to said actuating element engaging said cam; said dog and cam establishing a limit of travel for said first displacement and wherein said means for obtaining said second displacement comprise:

d. a notch in said cam, whereby after the expired delay time during which said cam rotates, said dog will engage in said notch to permit additional displacement, the degree of displacement being limited by the depth of said notch.

4. Apparatus according to claim 2 wherein said first and second projections are contained on arm coupled to said actuating element and further including means for adjusting the lateral position of said arm with respect to said drive shaft.

5. Apparatus according to claim 4 wherein said actuating element contains a plurality of switching arms corresponding to the number of contacts to be switched and further including means for adjusting said switching arms in the displacement direction of said actuation element.

6. Apparatus according to claim 5 and further including an additional contact element and means coupled to the armature of said solonoid for directly actuating said contact element.

7. Apparatus according to claim 5 and further including a pawl pivoted about an axis, said pawl containing means cooperating with said armature to lock said armature in the on position during the predetermined delay time, and means on said actuation element for unlocking said pawl at the end of said predetermined delay time.

8. Apparatus according to claim 7 wherein said means for unlocking comprise a projection on said pawl and an unlocking dog on said actuation element.

9. Apparatus according to claim 7 wherein said pawl includes a shaft about which it rotates, said shaft being supported in a half-shell bearing depression in a bearing plate fixed relative to the housing.

10. Apparatus according to claim 1 and further including an indicating device for indicating the different operational states of said timing relay.

11. Apparatus according to claim 10 wherein said indicating device comprises:

a. at least one viewing aperture on the front portion of said relay;

b. an indicator arm coupled to the actuating element and containing thereon two different marking symbols one behind the other in the displacement direction, said arm being arranged with respect to said viewing aperture such that prior to actuation neither of said symbols are aligned therewith, after said first displacement one of said symbols is aligned with said viewing aperture, and after said second displacement the other of said symbols is aligned with said viewing aperture.

* * * * *